United States Patent [19]

Thomas

[11] 4,024,900
[45] May 24, 1977

[54] APPARATUS FOR SELECTIVELY PROVIDING VEHICLE TRACTION

[76] Inventor: Marvin C. Thomas, Pinewood Springs, Lyons, Colo. 80504

[22] Filed: July 17, 1975

[21] Appl. No.: 596,322

[52] U.S. Cl. .............................. 152/214; 152/225 R
[51] Int. Cl.² ......................................... B60C 27/20
[58] Field of Search ...... 152/214, 216, 213, 225 R; 301/41 R, 43, 45

[56] References Cited
UNITED STATES PATENTS

| | | | |
|---|---|---|---|
| 3,311,150 | 3/1967 | Wykoff | 152/214 |
| 3,422,870 | 1/1969 | Thomas | 152/214 |
| 3,482,617 | 12/1969 | Putt et al. | 152/214 |

Primary Examiner—Stanley H. Tollberg
Assistant Examiner—Francis J. Bartuska
Attorney, Agent, or Firm—O'Rourke, Harris & Hill

[57] ABSTRACT

Method and apparatus for providing selectively engageable and disengageable traction surface, on the periphery of a vehicle wheel by means of an apparatus mounted to a fixed portion of a vehicle, selective positioning of a journalled outer portion of the apparatus to engage and rotate with the outer, or tire, portion of the wheel, or, alternatively, to retract to a stored inactive position. The apparatus further provides for positive deployment with spring-loaded extension pressure, accommodation of localized variations in diameter and resilient mounting of traction bars.

19 Claims, 10 Drawing Figures

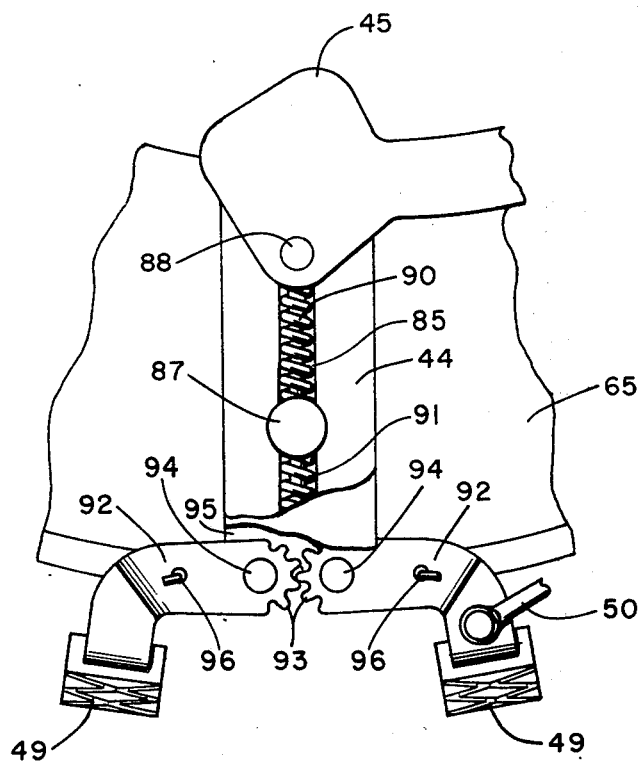
FIG. 5
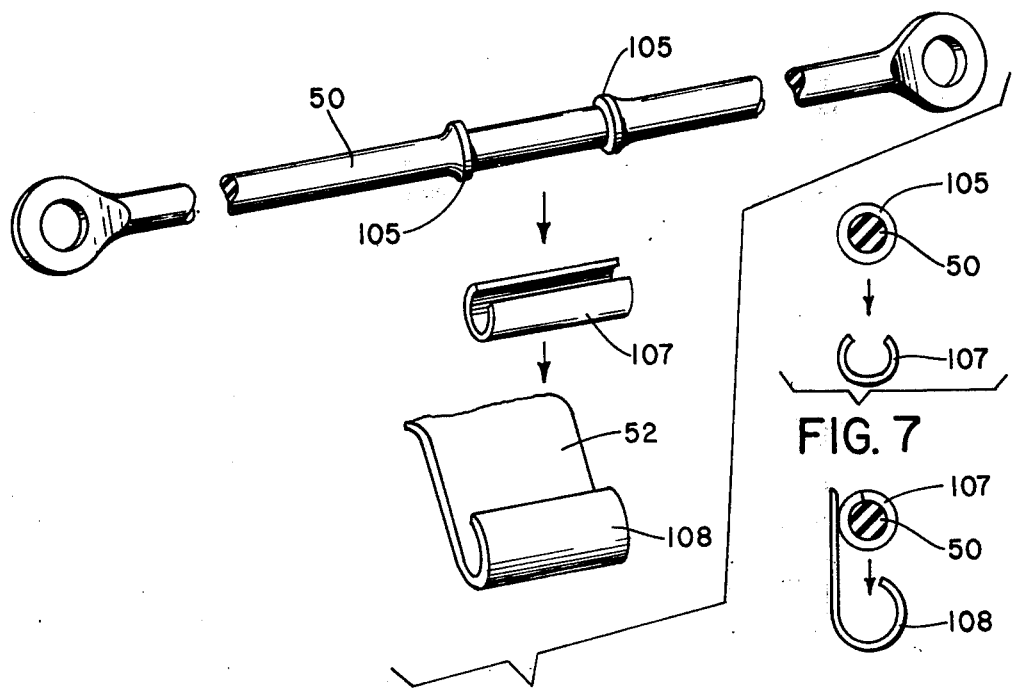
FIG. 6
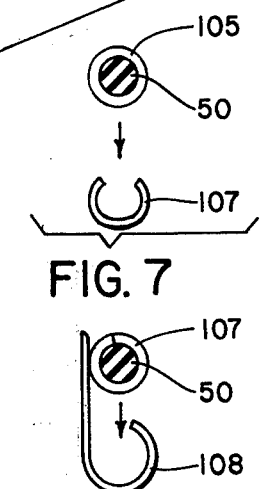
FIG. 7
FIG. 8

4,024,900

APPARATUS FOR SELECTIVELY PROVIDING VEHICLE TRACTION

BACKGROUND OF THE INVENTION

1. Field of the Invention

The present invention relates generally to apparatus and method for selectively providing traction to a wheeled vehicle, and more particularly, to a method and apparatus utilizing a device mounted to or adjacent to the wheel which device may alternatively be engaged to rotate with the wheel and provide traction bars, or lugs, on the periphery of the wheel or, alternatively, be retracted into a stored configuration adjacent the wheel. 2. Description of the Prior Art Classically, traction enhancing apparatus for wheeled vehicles have involved permanently mounted traction bars, such as lugs on snow tires or tractor tires, or manually mounted removable traction means such as tire chains.

As an improvement to these classical approaches, my U.S. Pat. No. 3,422,870 issued Jan. 21, 1969 disclosed a pantograph linkage rotatably mounted to a backing plate and selectively, extendable to engage and rotate with the tire, or retractable for storage. While this prior concept is basically sound and constitutes a substantial improvement over the classical traction devices, I have now found aspects thereof which are subject to marked improvement. The traction bars of my prior patent device are rigidly attached to the pantogram thus inducing force directly into the rather rigid triangulated pantogram configuration. Further, in the event of a deflated tire or the wheel impacting an obstruction, the pantogram does not readily accommodate localized variation in diameter. By its very nature, the pantogram seeks to maintain all traction bars at the same diameter and thus does not conform to variations in tire diameter. As a result of the use of the pantogram linkage, the prior structure necessarily relied upon the linkage geometry to provide a traction bar diameter corresponding to that of the wheel.

SUMMARY OF THE INVENTION

The present invention, which provides a heretofore unavailable improvement over previous traction apparatus and methods, comprises a structure in which traction bars are secured by resilient members which accommodate localized variations in configuration. The method and apparatus, in response to the positioning of an activating member, utilizes several eccentric slots which accurately position the substantially independent traction bars in a configuration engaging the periphery of the wheel, usually the tire tread. Thus, the traction bars are not rigidly positioned by a triangulated linkage.

Accordingly an object of the present invention is to provide a new and improved method and apparatus for selectively engaging substantially independent traction members in alternative configurations either complying with and rotating with the periphery of a wheel assembly, or, alternatively, retracted into a stored position.

Another object of the present invention is to provide a new and improved method and apparatus for providing traction on wheeled vehicles which resiliently locates traction bars when in an operable mode.

Yet another object of the present invention is to provide a new and improved method and apparatus for providing traction in which the device is deployed to engage a wheel perimeter by eccentric slots.

Still another object of the present invention is to provide a new and improved method and device for selectively improving the traction of the wheel assembly in which the traction bars may be independently positioned at differing diameters.

Still yet another object of the present invention is to provide a new and improved method and apparatus for enhancing the traction of the wheel assembly by means of linkages which may be independently retracted when one portion of the linkage is precluded from retraction.

These and other objects and features of the present invention will become apparent from the following description.

BRIEF DESCRIPTION OF THE DRAWING

In the drawing

FIG. 5 is a partially cutaway enlarged view of an end support means;

FIG. 6 is an exploded view illustrating a preferred interface between a traction bar and a resilient connector;

FIG. 7 is a partially sectioned view further showing the details of the structure shown in FIG. 6;

FIG. 8 is a partially sectioned view further showing the details of the structure shown in FIG. 6;

DETAILED DESCRIPTION OF THE INVENTION

Figure 1:
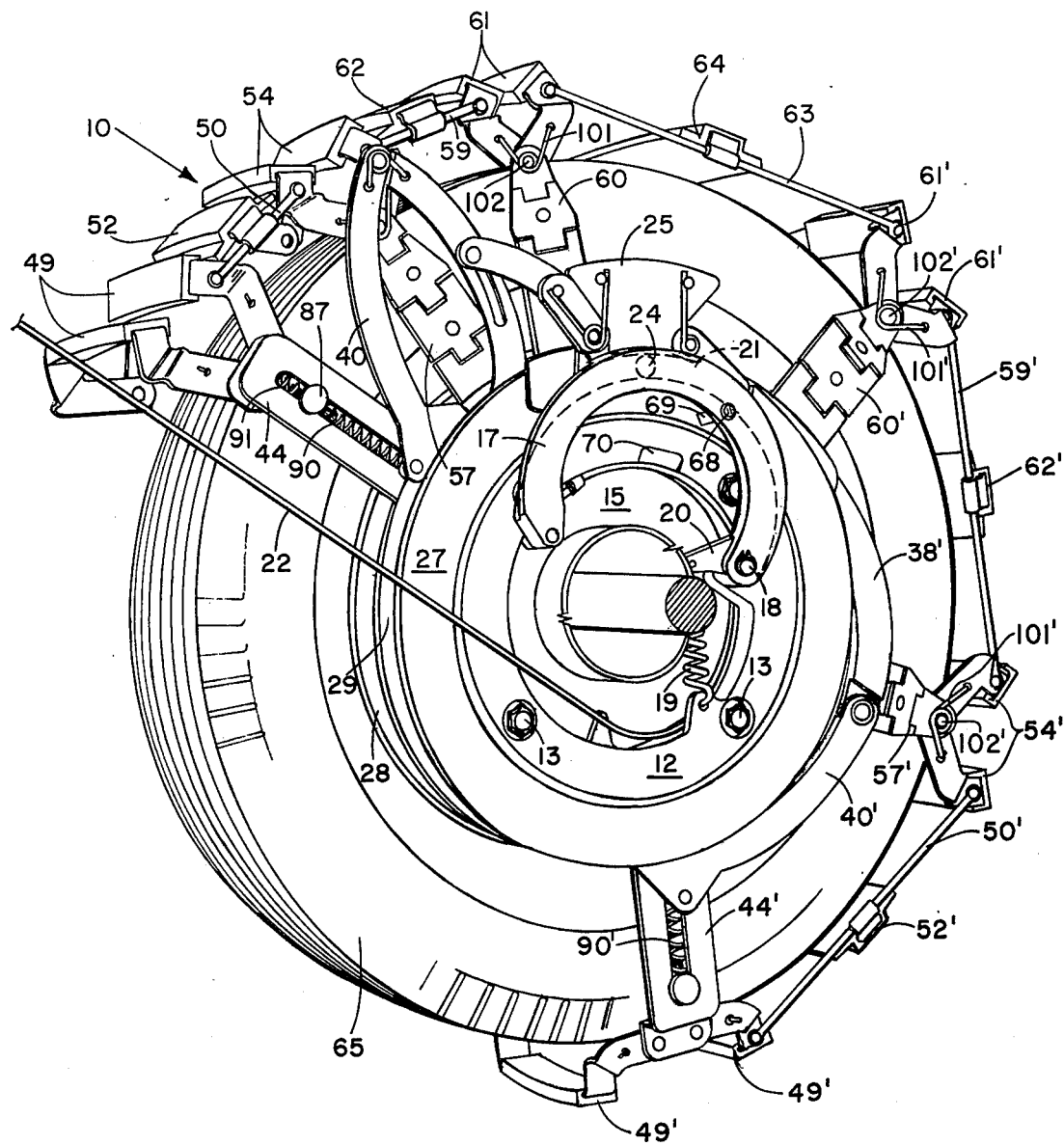
FIG. 1 is a perspective view of the rear portion of a wheel assembly having a traction apparatus in accord with the present invention mounted thereon.

Turning now to the drawings, where like components are designated by like reference numerals throughout the various figures, a device for selectively enhancing traction is illustrated in FIG. 1 and generally designated by reference numeral 10. Traction device 10 includes fixed plate 12 secured by fasteners 13 to the backing plate 15 of a conventional wheel assembly. It is to be understood that, though fixed plate 12 is shown as secured to backing plate 15, fixed plate 12 can equally as well be mounted to a shock absorber mount, axel or other such unsprung portion of a vehicle.

Figure 3:
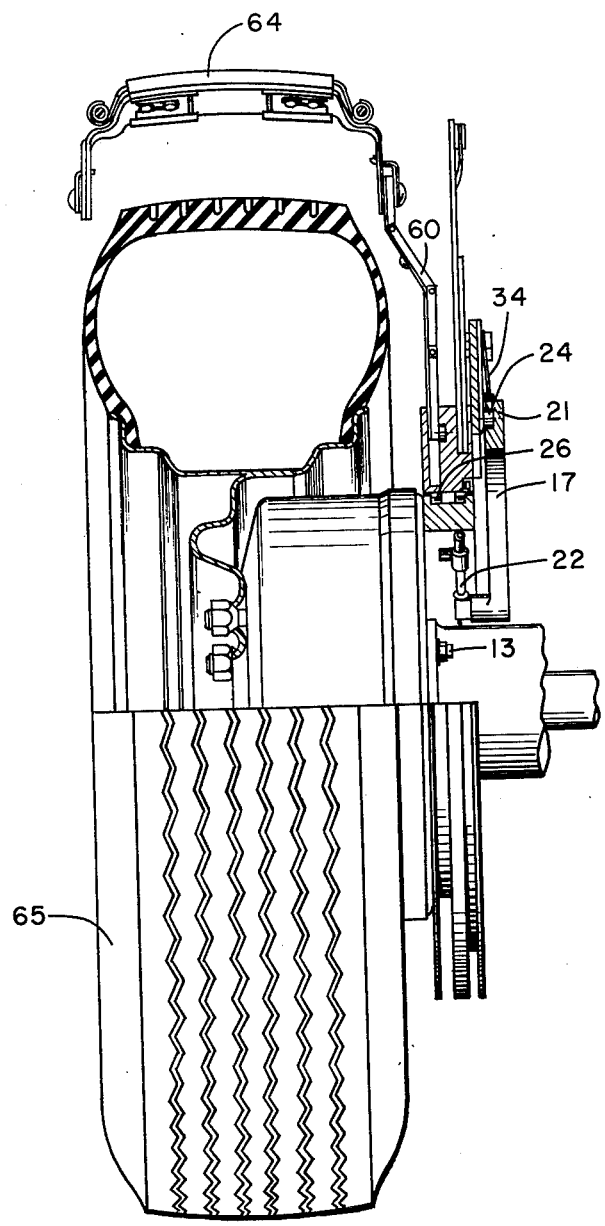
FIG. 3 is an end view partially sectioned along line 3—3 of an apparatus in accord with the present invention.

Control member 17 is movably attached to fixed plate 12 by pivot 18 and biased into a position substantially concentric with—in the illustrated embodiment—fixed plate 12 by spring 19 attached between fixed plate 12 and arm 20 depending from control member 17. When it is desired to deploy traction device 10 to a wheel engaging position, control cable 22,—the function of which may also be served by other activating means such as electrical, hydraulic, pneumatic or manual means—is released to permit control member 17 to move around pivot 18 and into a concentric position relative to the center of rotation. This permits roller cam follower 24 mounted on central plate 25 to ride down control groove 21 defined in central member 17 and initiate rotation of the outer portion of traction device 10 journalled, as shown in FIG. 3, on fixed plate 12 by means of bearings 26.

The journalled interface permits rotational movement of outer support assembly 27, having recesses 28 and 29 defined therein. A series of linkages and supports, which will be described in more detail below, are movably secured to outer support assembly 27, primarily by means of slots defined in the sidewalls of recesses 28 and 29 and protrusions from the supports engaged in such slots.

Figure 2:
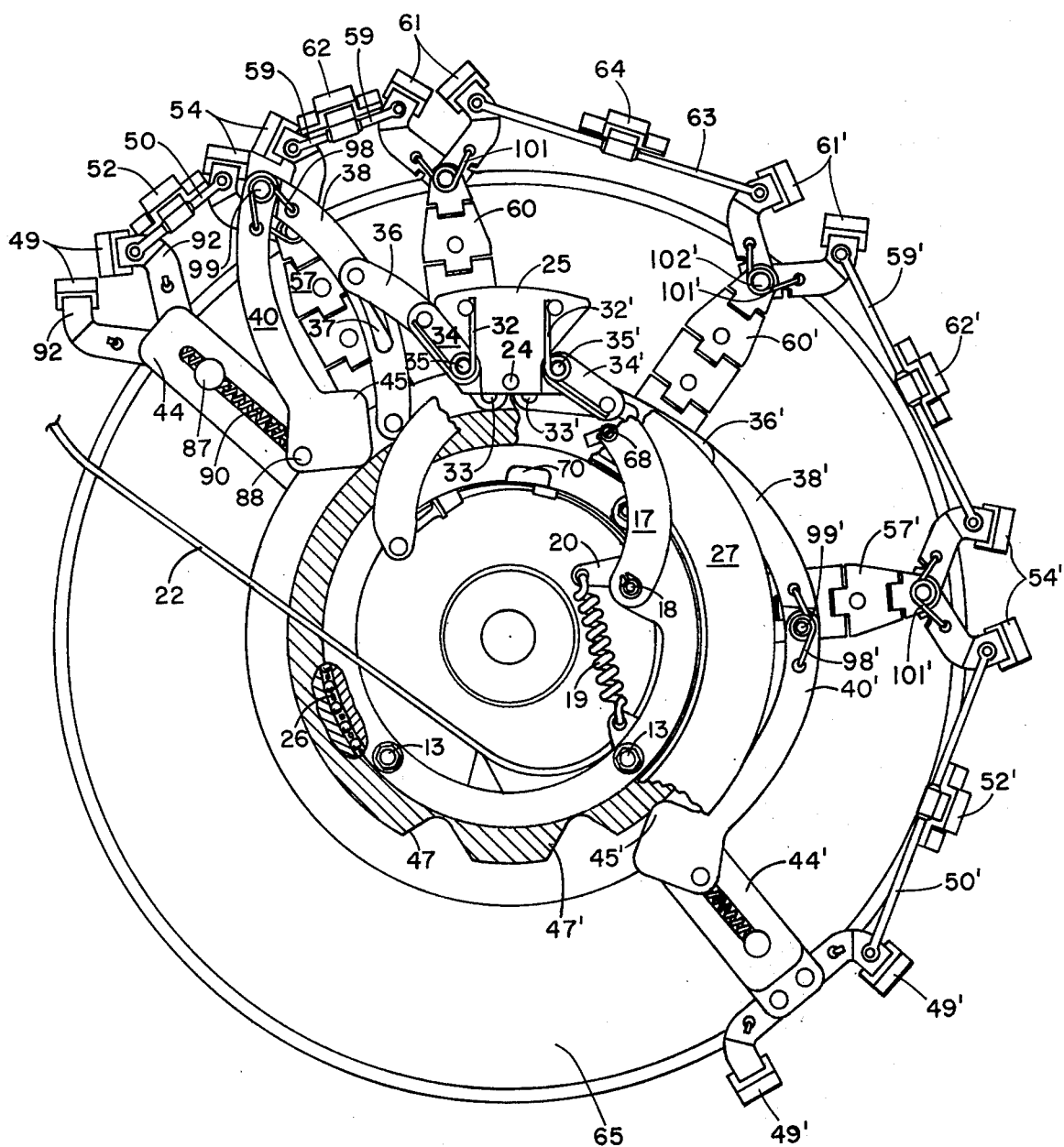
FIG. 2 is a partially sectioned rear view of a wheel assembly in accord with the present invention.

More specifically, it will be noted, for instance from FIG. 2, that the linkages and traction members extend symmetrically from either side of central plate 25 and are connected, directly or indirectly, to central plate 25 by means of biasing springs 32 and 32' in conjunction with pivots 35 and 35'. Throughout this discussion elements shown in the extended (right side of FIG. 1) position will be identified with numerals having a "prime" while corresponding elements in the retracted position will be identified without benefit of the "prime".

Links 34 and 34', attached at pivots 35 and 35' to central plate 25, connect to members 36, 36', respectively at slot 37 defined in members 38 and 38'. Pivots 33 and 33' connect members 36 and 36' to outer support assembly 27. Members 38 and 38' are connected to extendors 40 and 40'. Extendors 40 and 40' also carry end support means 44 and 44'. Thus, when extendors 40 and 40' are displaced by members 38 and 38', end support means 44 and 44' guide the movement of the assembly along slots 74 and 74', shown in FIG. 4, until the dogs 45 and 45' defined on the end portion of extendors 40 and 40' are positioned in detents 47 and 47'. Thus, extendors 40 and 40' are, as a result of the nesting of dogs 45 and 45' in detents 47 and 47', secured to outer support assembly 27 and free to rotate with outer support assembly 27 which, in turn, is journalled on fixed plate 12 by bearings 26.

Attached at each terminus of outer end support means 44 and 44' are a pair of traction bars 49 and 49' as well as resilient connectors 50 and 50' which each in turn carry another traction bar 54 and 54' carried similarily on intermediate support means 57 and 57'. Intermediate support means 57 and 57' are each again similarly connected with yet another pair of resilient connectors 59 and 59' to inner support means 60 and 60' with resilient connectors 59 and 59' each carrying yet another traction bar 62 and 62' respectively. Inner support means 60 and 60' each carry traction bars 61 and 61' respectively and are connected together by resilient connector 63 which carries another traction bar 64.

Figure 4:
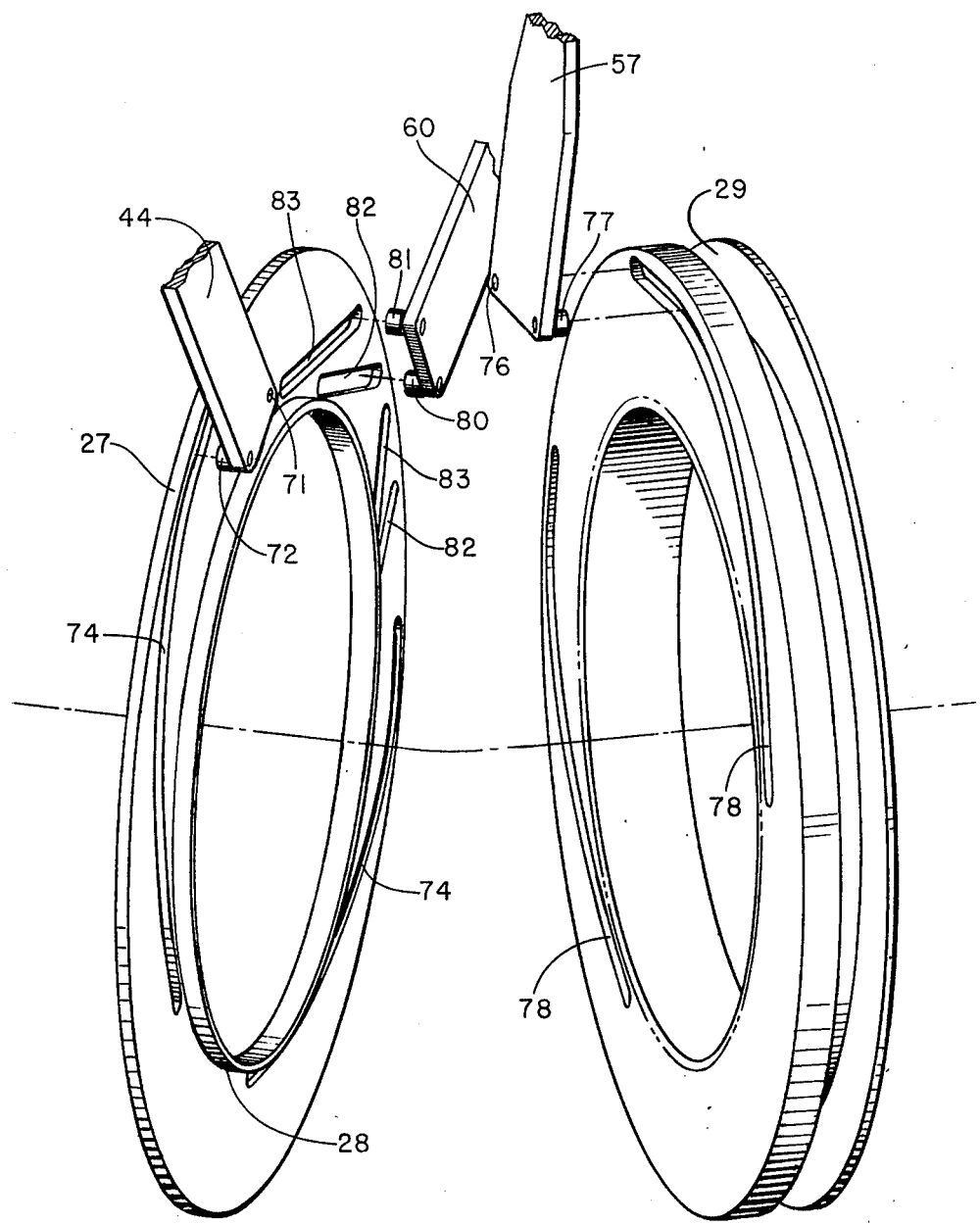
FIG. 4 is an exaggerated perspective view of the outer support assembly illustrating the recesses defined therein.

The lower portions of end support means 44 and intermediate support means 57 are positioned in slots 74 and 78 respectively shown in FIG. 4 and extending eccentrically towardds and away from the center of the assembly. The lower portions of inner support means 60 are each positioned in two slots 82 and 83. Thus, in the extended position, support means 44', 57' and 60' move towards the center of the assembly thus positively positioning traction bars 49', 52', 61', 62' and 64 against tire 65. The details of this aspect of traction device 10 will be more fully discussed below.

In actual operation, traction bars 49, 52, 61, and 62 would also be in contact with, and free to rotate with tire 65 to provide improved traction. When control member 17 is positioned in the raised position, as shown in FIGS. 1 and 2, traction device 10 is retracted into the configuration shown at the left portion of these figures. If the assembly is precluded from retracting when control member 17 raises central plate 25, bias spring 32' is distended to temporarily accommodate deployment of traction device 10. However, when, for instance, tire 65 rolls to free traction bars 49', dog 45' will disengage from detent 47' to permit biasing spring 32' to complete retraction of the traction device 10.

Also, as shown in FIG. 2, control member 17 includes a spring loaded pin 68 which fits into an opening 69 having a ramp portion defined in outer support assembly 27. Accordingly, when control member 17 is in the nonconcentric, retracting position, spring loaded pin 68 will engage opening 69 thereby precluding further rotation of outer support assembly 27. However, when cable 22 is released permitting control member 17 to rotate into the concentric, extended position, spring loaded pin 68 will ride up the ramp portion of opening 69 and out of opening 69 thereby freeing outer support assembly 27 to rotate on fixed plate 12. Ramp 70 is provided on fixed plate 12 to permit spring-loaded pin 68 to ride over the edge of fixed plate 12.

Other details of traction device 10 will be more readily understood with regard to the illustrations of the more detailed drawings. For instance, recess 28 is shown in FIG. 4 in an exaggerated fashion to more clearly present the attachment of end support means 44, intermediate support means 57 and inner support means 60 to outer support assembly 27, and particularly to recess 28. As illustrated, the lower terminus of end support means 44 includes roller protrusions, 71 and 72, both of which engage eccentric slot 74 defined in one side wall of recess 28. Thus end support means 44, when rotated relative to outer support assembly 27, will move from a given diameter to a greater or lesser diameter as it moves along eccentric slot 74. Intermediate support means 57 similarly has roller protrusions 76 and 77 which engage and move in eccentric slot 78 defined in the opposite wall of recess 28 as is eccentric slot 74. It will be noted that while the radial portion of movement of slot 78 is essentially the same as that of slot 74, the angular length of slot 78 is substantially shorter to permit intermediate support means 57 to engage tire 65 with less rotational movement relative to outer support assembly 27. Inner support means 60 also has two roller protrusions 80 and 81, but each of protrusions 80 and 81 fit into a separate slot 82 and 83, respectively, which are defined in a common side wall of recess 28 as is slot 74. Slots 82 and 83 are defined with a most substantial radial component and accordingly accommodate but one of protrusions 80 and 81 to maintain the orientation of inner support means 60 during travel from one extreme to the other of slots 82 and 83.

More details of the arrangement of end support means 44 are shown in FIG. 5. End support means 44 includes a slot 85 defined longitudinally therein with free floating pins 87 and 88 disposed in slot 85. Spring 90 is contained in slot 85 and between pins 87 and 88. Spring 91 is also contained in slot 85 between pin 87 and the outer end of end support means 44. Springs 90 and 91 bias dog 45 into detent 47, as shown in FIG. 2, to maintain the assembly in a stable configuration when extended and in the traction producing mode. Also, as shown in the cutaway portion of FIG. 5, traction bars 49 are each secured at the end of symmetrical arms 92.

Arms 92 each have mutually meshing gear portion 93 at the end portion thereof and pivots 94 securing arms 92 to floating member 95 carried with pin 87 in slot 85. Thus when traction device 10 is in the extended position, resilient connector 50 is under tension and pulls one of arms 92 into a position contacting traction bar 49 with tire 65. Gear portions 93 drive the other traction bar 49 into contact with tire 65. In the retracted position, torsion spring 96 pivots traction bars 49 into a stored, collasped position, as shown in FIG. 2. When dog 45 is displaced from detent 47, pin 88 is displaced upward towards the opposite end of slot 85 thereby compressing springs 90 and 91 to, in turn, displace floating member 95, attached arms 92 and ultimately traction bars 49 away from tire 65 to permit retraction without substantial interference between tire 65 and end support means 44.

As illustrated in FIGS. 1 and 2, to aid in deployment of traction device 10, springs 98 and 98' bias members 38 and 38' and extendors 40 and 40' into an open position around pivots 99 and 99'. This force helps to balance the very substantial forces generated by resilient connectors 50, 50', 59, 59' and 63 and thus aids in deploying traction device 10 when control member 17 is in the concentric position. Also, upon retraction, springs 101 on each of support means 57, 57', 60 and 60', close traction bars 54, 54', 61, and 61' around pivots 102 and 102'.

The means of attachment of traction bar 52 to resilient connector 50 is illustrated in detail at FIG. 6 and is, of course, identical to the attachment of the other traction bars to the other resilient connectors. Intermediate the length of resilient connector 50 shoulders 105 are defined to receive crimpable collar 107. Collar 107, which is preferably metal, receives curved portion 108 of traction bar 52. As shown in FIG. 6, collar 107 fits over the portion of resilient connector 50 between shoulders 105 and, as shown in FIG. 7, is then crimped to encircle resilient connector 50. Then, as shown in FIG. 8, curve portion 108 is distended somewhat to receive and secure collar 107 therein.

Figure 9:
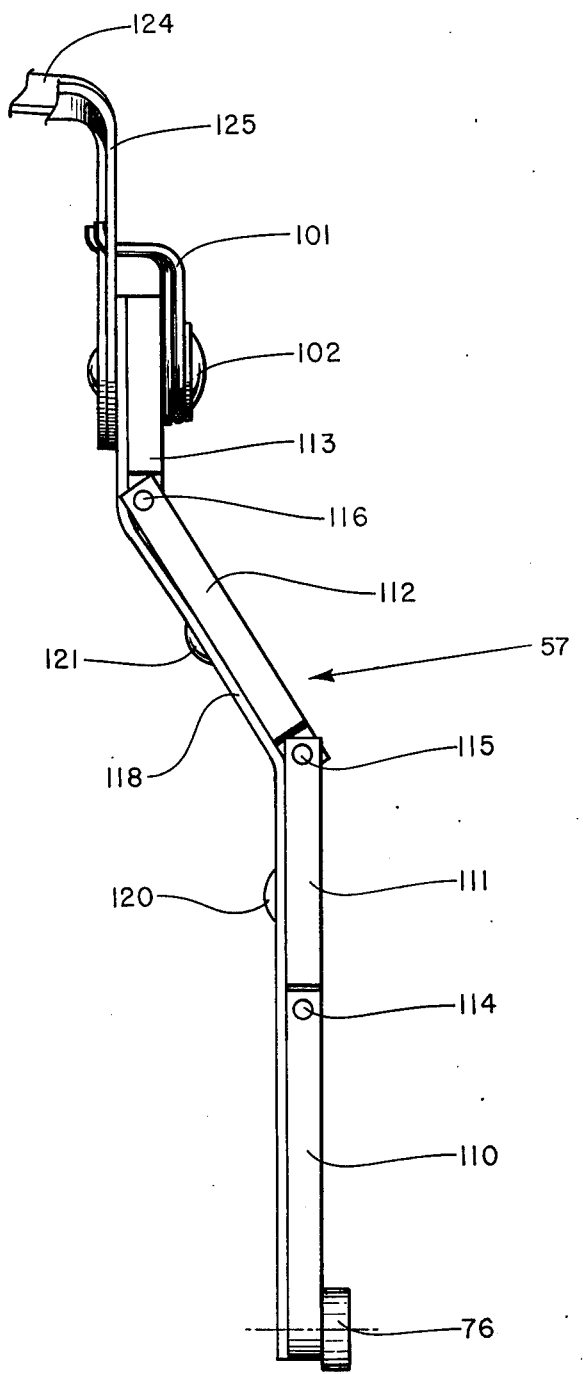
FIG. 9 is an enlarged view of a support means.

The specific features of support means 57 are illustrated in FIG. 9. As shown, support menas 57 comprises links 110, 111, 112, and 113 movably joined together at the end portions thereof by pivots 114, 115, and 116. A strip of spring material 118 is attached at link 111 by fastener 120 and at link 112 by fastener 121. Spring strip 118 thus biases the connected links 110, 111, 112, and 113 into a desired nominal position while permitting radial distortion by a combination of pivoting around the pivoted ends of the links 110, 111, 112 and 113, and distortion of spring strip 118. Arms 124 and 125, which carry traction bars 54 as shown in FIG. 1, are attached to link 113 by pivot 102 and carry spring 101 as described above.

Figure 10:
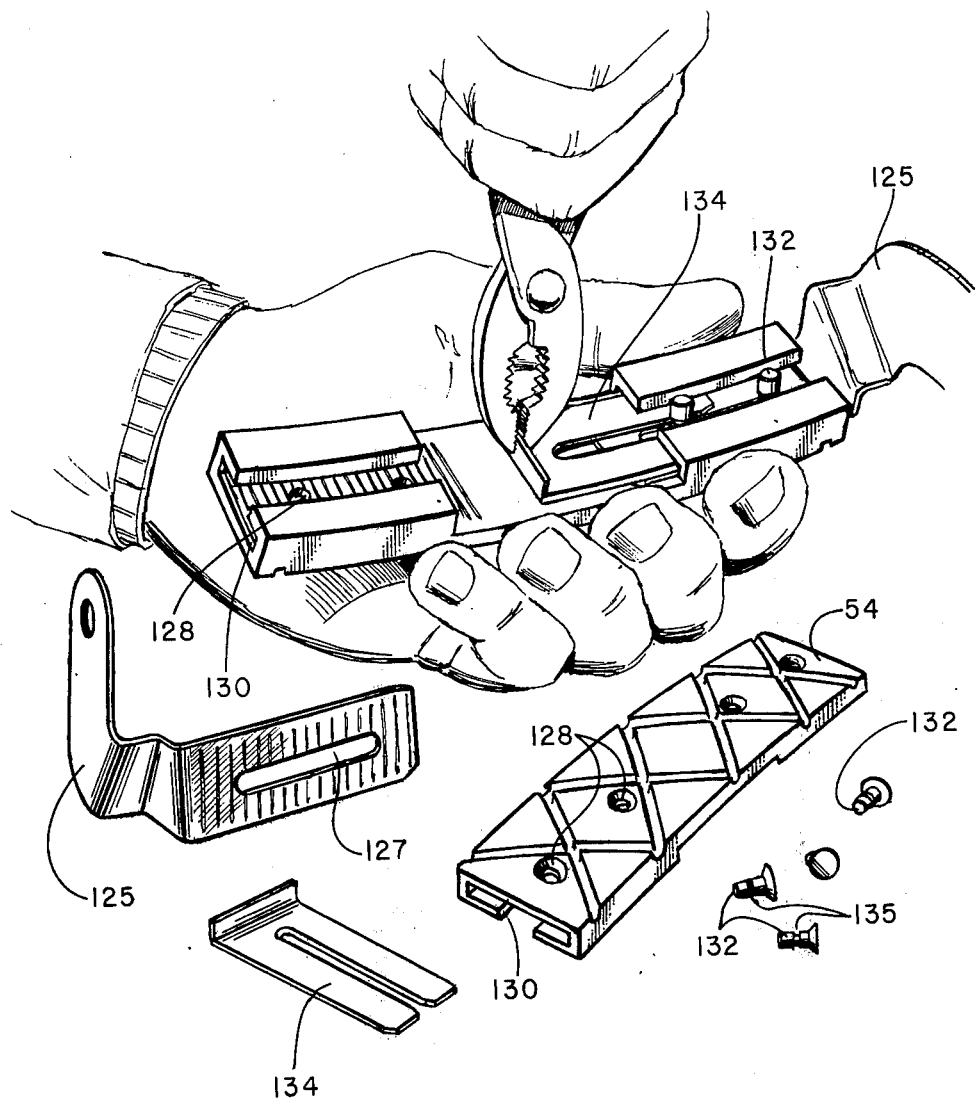
FIG. 10 is a perspective view illustrating the assembly detail of a traction bar.

The details of the assembly of traction bars are shown in FIG. 10. As shown, arm 125 includes a slot 127 defined therein. Traction bar 54 includes a number of openings 128 therethrough. Thus arm 127 is inserted into one of the partially open channels 130 defined in traction bar 54 in alignment with openings 128. Fasteners 132 are then passed through openings 128 and slot 127. Retainer 134 is inserted as illustrated to engage circumferential indents 135 defined in fasteners 132 to secure the system. The surface of traction bar 54 may be as illustrated or of many different traction aiding designs depending upon the nature of the surface involved. Traction bar 54 may be produced of rubber, metal, or polymeric materials, for instance. Lugs, chain links or other such configurations may be formed on the surface of traction bar 54.

Summarily, it will be apparent from the above discussion and from the drawings that the instant invention provides not only a convenient means for providing traction enhancement equivalent to that afforded by the more inconvenient tire chains, but that the traction device is also durable and tolerant of the more adverse operating conditions normally encountered. It is expected that the illustrated and above described mechanism would be protected from the elements by a pliable boot. Thus ice, snow, corrosive salts and other such matter would not adversely affect the mechanism.

Though the device has been described in rather particular detail, it will of course be apparent to those skilled in the art that a number of the specifics and details concerning the device may be altered and changed without compromising the advantages. Thus, although only one embodiment of the present invention has been illustrated and described, it is anticipated that various changes and modifications will be apparent to those skilled in the art and that such changes may be made without parting from the scope of the invention, as defined by the following claims.

What is claimed is:

1. A traction device comprising:
a mounting means, an outer support assembly journaled around an axis and rotatably carried on the mounting means, a plurality of radially deformable support members extending from the outer support assembly and movably secured at one end to the outer support assembly in slots defined in the outer support assembly and said slots being eccentric to the axis, at least one traction bar mounted at each end portion of the support members remote from the end thereof secured to the outer support, linkage means interconnecting the support members, and control means to selectively expand the linkage means and attached support members into a circular configuration and, alternatively, to retract the linkage means and position the attached support members in a closely spaced, stored configuration as a function of the positioning of the control means, whereby, the traction device, when mounted by attachment of the mounting means adjacent a vehicle wheel, is capable of extending the traction bars into engagement with vehicle wheel to provide traction or, alternatively, contract the linkage and retract the traction bars from the wheel into a stored position by selective positioning of the control means.

2. A traction device as set forth in claim 1 in which adjacent support members are connected at the ends bearing the traction bar by means of resilient connectors extending therebetween.

3. A traction device as set forth in claim 2 in which each pair of adjacent support members are connected by a pair of resilient connectors and a traction bar is supported by the resilient connectors intermediate the traction bars supported on the support members.

4. A traction device as set forth in claim 3 in which the traction bars are releasably secured between the pair of resilient connectors.

5. A traction device as set forth in claim 1 in which a pair of traction bars are supported on articulated bifurcated portions at each support assembly and with each traction bar being secured to one of the bifurcated portions extending from the support member, and means are included to open the bifurcated supports upon extension of the linkage means and support members, and to close the bifurcated support upon retraction and storage of the linkage means and support members.

6. A traction device as set forth in claim 5 in which the bifurcated supports are spring loaded to a closed position and opened by resilient connectors extending between adjacent support members whereby the resilient connectors urge the bifurcated supports into an open position as the support members are extended.

7. A traction device as set forth in claim 1 including a plurality of traction bars releasably secured to the traction device at the outer periphery thereof, whereby the traction bars may be removed and replaced conveniently.

8. A traction device as set forth in claim 1 in which the support members are movably secured to the outer support assembly by means of protrusions extending from the end of each support member and engaged and secured by the eccentric slots.

9. A traction device as set forth in claim 1 in which the support members are arranged symmetrically relative to the central control means and each outer most end support member is attached to a linkage member having a dog defined thereon and the outer support assembly has defined therein detents at positions corresponding to that of the dogs when the linkage means if fully extended, whereby the dogs engage the detents and secure the extended linkage means and support members to the outer support assembly during rotation around the mounting means.

10. A traction device as set forth in claim 9 in which at least one traction bar is secured with radial freedom of movement to each of the outermost end support members and in contact with spring means which bears upon the linkage member having the dog to move the traction bar at the end of the end support member radially outward as the dog is displaced from the detent.

11. A traction device as set forth in claim 1 in which the control means comprise a control member pivotally secured to the mounting means at one end of the control member and adapted for movement between a projecting position adjacent the outer support assembly and a concentric position adjacent the mounting means, the control member including a control surface which engages a follower member attached to the linkage means to selectively position the linkage means and support member in the retracted and extended positions as a function of the position of the control member in the projecting and concentric positions, respectively.

12. A traction device as set forth in claim 11 including interlock means between the control member and the outer support assembly to preclude rotation of the outer support assembly relative to the mounting means when the control member is in the projecting position to retract the linkage means and support members.

13. A traction device as set forth in claim 12 in which the interlock control means comprise a spring loaded pin extending from the control member and an opening having a ramp portion defined in the outer support assembly, whereby the pin engages the opening to preclude movement of the outer support assembly and, upon relocation of the support member, moves up the ramp to free the outer support assembly for rotation.

14. A traction device as set forth in claim 1 including biasing spring means positioned between the control means and the linkage means to accommodate dislocations induced by positioning of the control means retract position when the linkage means is precluded from retracting.

15. A traction device as set forth in claim 1 in which at least one of the support members comprises a plurality of links pivotally attached at adjacent end portions thereof together to form an elongated, articulated structure, the articulated structure being attached to a length of spring material configured to maintain the articulated link structure in a nominal position but being deformable to provide a radially deformable support member.

16. The combination of a traction device and a wheel of a vehicle in which the traction device includes an outer support assembly rotatably mounted concentric with the axis of rotation of the wheel and adjacent to but axially spaced from the wheel, a plurality of radially deformable support members extending from the outer support assembly in a radial manner and movably secured to a series of slots defined in the outer support assembly and said slots being eccentric relative to the axis of wheel rotation, linkage means interconnecting the support members to maintain the support members in a spaced relationship and to move the support means relative to the slots defined in the outer support assembly, traction bars carried at the end of the support members opposite that attached to the outer support assembly and extending from the support members over the periphery surface of the wheel in a cantilevered manner, and control means to selectively expand the linkage means, attached support members and traction bars into a circular configuration around the axis of wheel rotation with the traction bars contacting and moving with the periphery of the wheel in a substantially equally spaced manner and, alternatively, to retract linkage means, support members and attached traction bars into a closely spaced, stored configuration with the traction bars radially spaced from the periphery of the wheel, the configuration being a function of the position of the control means.

17. A traction device and wheel combination as set forth in claim 16 in which each pair of adjacent support members are connected by a pair of resilient connectors extending on either side of the periphery surface of the wheel.

18. A traction device and wheel combination as set forth in claim 17 in which a traction bar is supported at each end by one of the resilient connectors in a position between the traction bar supported on the supported members.

19. A traction device and wheel combination as set forth in claim 16 in which the control means and outer support assembly further include interlock means to preclude rotation of the outer support assembly with the wheel when the control means is positioned to retract the support members and linkage means into the stored position.

* * * * *

UNITED STATES PATENT AND TRADEMARK OFFICE
CERTIFICATE OF CORRECTION

PATENT NO. : 4,024,900
DATED : May 24, 1977
INVENTOR(S) : Marvin C. Thomas

It is certified that error appears in the above-identified patent and that said Letters Patent are hereby corrected as shown below:

Column 3, line 58 "towardds" should be "towards"
Column 5, line 43 "menas" should be "means"
Column 6, line 48 "with vehicle" should be "with a vehicle"
Column 7, line 29 "means if" should be "means is"
Column 8, line 56 "supported on the supported" should be "supported on the support"

Signed and Sealed this

Thirteenth Day of December 1977

[SEAL]

Attest:

RUTH C. MASON
Attesting Officer

LUTRELLE F. PARKER
Acting Commissioner of Patents and Trademarks